United States Patent
Hoppe et al.

(10) Patent No.: US 8,844,900 B2
(45) Date of Patent: Sep. 30, 2014

(54) ACTIVATION ELEMENT OF AN ELECTROMAGNETIC ACTUATING UNIT OF A HYDRAULIC VALVE

(75) Inventors: Jens Hoppe, Erlangen (DE); Stefan Konias, Erlangen (DE); Yi Wang, Erlangen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 880 days.

(21) Appl. No.: 13/032,352

(22) Filed: Feb. 22, 2011

(65) Prior Publication Data

US 2011/0204269 A1    Aug. 25, 2011

(30) Foreign Application Priority Data

Feb. 22, 2010   (DE) .......................... 10 2010 008 773

(51) Int. Cl.
*F16K 31/02*   (2006.01)
*F16K 31/06*   (2006.01)
*H01F 7/08*    (2006.01)

(52) U.S. Cl.
CPC ......... *F16K 31/061* (2013.01); *H01F 2007/086* (2013.01)
USPC ........ 251/54; 251/129.15; 335/261; 335/277; 335/279

(58) Field of Classification Search
USPC ........... 251/48, 50, 54, 129.15; 335/261, 277, 335/279
See application file for complete search history.

(56) References Cited

U.S. PATENT DOCUMENTS

| | | | | |
|---|---|---|---|---|
| 2,407,963 | A | * | 9/1946 | Persons ................... 335/261 |
| 3,446,473 | A | * | 5/1969 | Barker ...................... 251/64 |
| 4,634,096 | A | * | 1/1987 | Hara ..................... 251/129.15 |
| 4,784,368 | A | * | 11/1988 | Koch et al. .................. 251/51 |
| 5,601,275 | A | * | 2/1997 | Hironaka ............... 251/129.15 |
| 5,722,633 | A | * | 3/1998 | Goossens et al. ....... 251/129.15 |
| 6,045,116 | A | * | 4/2000 | Willke et al. ........... 251/129.21 |
| 6,644,620 | B2 | * | 11/2003 | Johnson et al. .............. 251/126 |
| 6,644,623 | B1 | * | 11/2003 | Voss et al. ............. 251/129.15 |
| 6,739,571 | B2 | * | 5/2004 | Hironaka ..................... 251/50 |
| 6,808,160 | B2 | * | 10/2004 | Hayakawa et al. ...... 251/129.15 |
| 6,877,717 | B2 | * | 4/2005 | Collins et al. ............... 335/261 |
| 6,959,907 | B2 | * | 11/2005 | Hironaka ..................... 251/54 |
| 6,994,406 | B1 | * | 2/2006 | Krawczyk et al. ....... 251/129.15 |
| 7,040,594 | B2 | * | 5/2006 | Hironaka ..................... 251/54 |
| 7,229,064 | B2 | * | 6/2007 | Miller et al. ........... 251/129.21 |

FOREIGN PATENT DOCUMENTS

| | | |
|---|---|---|
| DE | 42 21 822 A1 | 1/1994 |
| DE | 100 51 614 A1 | 4/2001 |
| DE | 10 2005 046 065 A1 | 3/2007 |
| DE | 10 2005 050 887 B3 | 3/2007 |
| DE | 10 2005 058 846 A1 | 6/2007 |
| DE | 10 2006 031 517 A1 | 1/2008 |
| DE | 10 2007 058 620 B3 | 4/2009 |
| DE | 10 2008 014 238 A1 | 7/2009 |
| EP | 0 924 395 A2 | 6/1999 |

* cited by examiner

*Primary Examiner* — John Bastianelli

(74) *Attorney, Agent, or Firm* — Davidson, Davidson & Kappel, LLC

(57) ABSTRACT

An activation element of an electromagnetic actuating unit of a hydraulic valve which has an armature that is essentially cylindrical and which is arranged in a slidable fashion in the actuating unit. Also, a method for manufacturing an activation element of an electromagnetic actuating unit of a hydraulic valve. The activation element has at least one substantially cylindrical armature, one plunger rod and one magnet cone. The plunger rod and the magnet cone are embodied in one piece with the armature.

5 Claims, 2 Drawing Sheets

ACTIVATION ELEMENT OF AN ELECTROMAGNETIC ACTUATING UNIT OF A HYDRAULIC VALVE

This application claims priority of DE 10 2010 008 773.4 filed Feb. 22, 2010, which is incorporated by reference herein.

FIELD OF THE INVENTION

The invention relates to an activation element of an electromagnetic actuating unit of a hydraulic valve having an armature which is of essentially cylindrical design and which is arranged in a slidable fashion in the actuating unit, and a method for manufacturing an activation element of an electromagnetic actuating unit of a hydraulic valve, wherein the activation element has at least one substantially cylindrical armature, one plunger rod and one magnet cone, wherein the plunger rod and the magnet cone are embodied in one piece with the armature.

BACKGROUND OF THE INVENTION

Directional control valves of this type are used in internal combustion engines, for example for actuating hydraulic camshaft phasers or switchable cam followers. The directional control valves are composed of an electromagnetic actuating unit and a hydraulic section. At least one inflow port, at least one working port and one tank port are formed on the hydraulic section. Certain ports of the hydraulic section can be selectively connected by means of the electromagnetic actuating unit, and the pressure medium flows can therefore be deflected.

For the use of a directional control valve for controlling a camshaft phaser, the hydraulic valve is normally embodied as a 4/3 proportional directional control valve. Such a proportional valve is disclosed, for example, in DE 100 51 614 A1. In this embodiment, the electromagnetic actuating unit is permanently connected to the valve section. The electromagnetic actuating unit has a first magnet yoke, a coil, a second magnet yoke, an activation element and a connecting element which holds electrical contacts serving to supply power to the coil. The activation element is composed of an armature and a plunger rod which is connected in a functionally locking fashion to the armature.

The hydraulic section is composed of a valve housing and a control piston which is arranged in an axially slidable fashion therein. The valve housing is arranged within a receptacle opening in the first magnet yoke and is connected thereto in a positionally fixed fashion. A plurality of grooves are formed on the outer lateral surface of the valve housing, said grooves opening into the interior of the valve housing and serving as pressure medium ports. In the interior of the valve housing, a control piston is arranged in an axially slidable fashion, wherein the outer diameter of the control piston is adapted to the inner diameter of the valve housing. Furthermore, annular grooves, via which adjacent pressure medium ports can be connected, are formed on the control piston.

The coil and the first and second magnet yoke are arranged coaxially with respect to one another. The first and second magnet yokes are offset with respect to one another in the axial direction here. In the region of the first and second magnet yokes there is a pot-shaped armature guiding sleeve located radially within the magnet yokes, in which armature guiding sleeve the armature is held in an axially slidable fashion. The cylindrical inner lateral surface of the armature guiding sleeve serves to guide the armature; the base thereof limits the sliding of the armature in an axial direction.

A closed off space is formed between the base of the armature guiding sleeve and the armature which bears flush against the inner lateral surface thereof. The space can, on the one hand, act in an inhibiting fashion on a movement of the armature away from the base by virtue of a partial vacuum which occurs therein. Furthermore, leakage oil which enters into this space can inhibit axial movement of the armature into the base. In order to counteract this undesired effect, the armature is provided with axial drilled holes or axially extending grooves on its lateral surface for permitting pressure equalization between the spaces in front of and behind the armature.

The armature and the first and second magnet yokes form a flow path for a magnetic field which is brought about through energization of the coil. Energization of the coil causes the armature to be forced in the direction of the second magnet yoke, in which case this movement is transmitted onto the control piston by means of the plunger rod which is attached to the armature. Said control piston is then moved in the axial direction counter to a spring which is supported on the valve housing. The plunger rod is permanently connected to the armature. The armature and the plunger rod therefore form an activation element which, through energization of the coil, can be slid in the axial direction and activates the control piston of the hydraulic section, i.e. positions said control piston within the valve housing of the hydraulic section.

A further directional control valve is disclosed in DE 10 2006 031 517 A1. In this embodiment, the hydraulic section is embodied separately from the electromagnetic actuating unit, and is held in a cavity of a camshaft, with the result that during the operation of the internal combustion engine the hydraulic section rotates with the camshaft. The actuating unit is attached in a positionally fixed fashion to a cylinder head cover or cylinder head. The positioning is in turn brought about by an activation element which comprises an armature and a plunger rod which is connected thereto. In this context, the actuating movement of the armature is transmitted to the control piston of the valve section by means of the plunger rod which is pressed into a receptacle in the armature.

SUMMARY OF THE INVENTION

The invention is therefore based on the object of providing an activation element of an electromagnetic actuating unit of a directional control valve, and at the same time the manufacturing outlay thereon is to be minimized and the manufacturing costs thereof are to be reduced.

The object is achieved according to the invention in that for forming the armature an extrusion method is used by means of which the lateral surface and a base surface of said armature are formed in an off-tool fashion.

Electromagnetic hydraulic valves serve to control a pressure medium flow to a hydraulic consumer, and a pressure medium outflow from a hydraulic consumer, and said electromagnetic hydraulic valves comprise an electromagnetic actuating unit and a hydraulic section. The electromagnetic actuating unit comprises an activation element which has at least one armature which can be positioned within the actuating unit under the influence of a variable magnetic field. The actuating movement is transmitted to a control piston of the hydraulic section by means, for example, of a plunger rod, and the pressure medium flows are therefore controlled by said control piston.

The armature has, for example, a circular-cylindrical lateral surface which is bounded in the axial direction by a circular base surface and a circular covering surface. However, it is equally conceivable to have different shapes of the base surface and covering surface, for example ellipses or other armature geometries. The armature is manufactured by means of an extrusion method, wherein at least the lateral surface and the base surface are formed in an off-tool fashion. The outer contours which have to be manufactured with a very high degree of precision are therefore manufactured by means of the extrusion method without material-removing post-processing steps being necessary on said surfaces. In this method, a force is applied to a blank, for example a piece of wire, by means of a die, with the result that the material begins to flow below its melting temperature and fills a mold which is embodied as negative of the desired shape of the armature. The extrusion method can be adjoined by material-removing post-processing steps, for example in order to form a plunger rod or other additional functions.

The use of an extrusion method to manufacture the armature presents a cost-effective alternative to the armatures which are usually manufactured in a material-removing way. On the one hand, there is a saving on material and on the other hand the manufacture can be carried out with a significantly higher clock frequency in this way. At the same time, additional structures can be manufactured on the armature through simple adaptation of the shape, with the result that said structures are formed during the shaping process. Furthermore, this manufacturing method allows high surface quality levels to be achieved, with the result that post-processing steps can be eliminated. It is therefore possible, for example, to manufacture the lateral surface of the armature, which serves as a bearing surface of the armature, with the required surface quality.

In one development of the invention it is proposed that the lateral surface of the armature have a groove via which two spaces which are separated from the armature in the axial direction communicate with one another. It is therefore possible for pressure equalization between the spaces to take place during the axial movement of the armature, with the result that the hysteresis of the electromechanical actuating unit is minimized. The profile of the groove advantageously has an axial component and a component in the circumferential direction of the armature. The groove can run, for example, in a helical shape on the lateral surface of the armature. As a result, the bearing of the armature is improved and magnetic lateral forces are reduced. In this context it is possible to provide for the groove to be formed on the armature by means of the extrusion method in an off-tool fashion.

Furthermore, it is possible to provide that a base surface of the armature has a bulge which is formed on the armature by means of the extrusion method in an off-tool fashion. When the armature is deflected to a maximum degree, the bulge bears against an axial boundary face of the armature space and prevents the armature from bearing in a planar fashion on the boundary. As a result, the adhesion forces which act in this position are reduced.

In an advantageous development of the invention there is provision that a magnet cone is constructed on a covering surface of the armature, the outer lateral surface of which magnet cone is formed by means of the extrusion process in an off-tool fashion. The force/travel characteristic curve of the electromagnetic actuating unit can be kept constant within a broad travel interval by means of the magnet cone. The associated required surface quality of the outer lateral surface of the cone can be brought about by means of the extrusion method, with the result that there is again no need for post-processing steps. In order to obtain a more compact design, there may be provision for the magnet cone to be of annular design, i.e. for a cylindrical cavity to be formed radially within the conical outer lateral surface. If the armature moves toward a magnet yoke, the cavity can accommodate a region of the magnet yoke.

Furthermore, it is possible to provide that the activation element has a plunger rod which is embodied in one piece with the armature and extends in the axial direction starting from a covering surface of the armature.

According to the invention, the object is achieved by means of a method for manufacturing an activation element of an electromagnetic actuating unit of a hydraulic valve, wherein the activation element has at least one substantially cylindrical armature, one plunger rod and one magnet cone, wherein the plunger rod and the magnet cone are embodied in one piece with the armature, having the following method steps:

manufacture of a blank by means of an extrusion method, wherein a lateral surface of the armature and an outer lateral surface of the magnet cone are embodied in an off-tool fashion and the blank has a material region adjoining an axial end of the magnet cone, construction of the plunger rod by material-removing processing of the material region, and construction of a cavity radially within the magnet cone by means of a material-removing method.

The number of individual parts of the activation element is therefore reduced to a minimum, and at the same time the expenditure on the removal of material is reduced to a minimum.

BRIEF DESCRIPTION OF THE DRAWINGS

Further features of the invention emerge from the following description and from the drawings in which exemplary embodiments of the invention are illustrated in a simplified fashion. In said drawings.

DETAILED DESCRIPTION OF THE INVENTION

Figure 1:
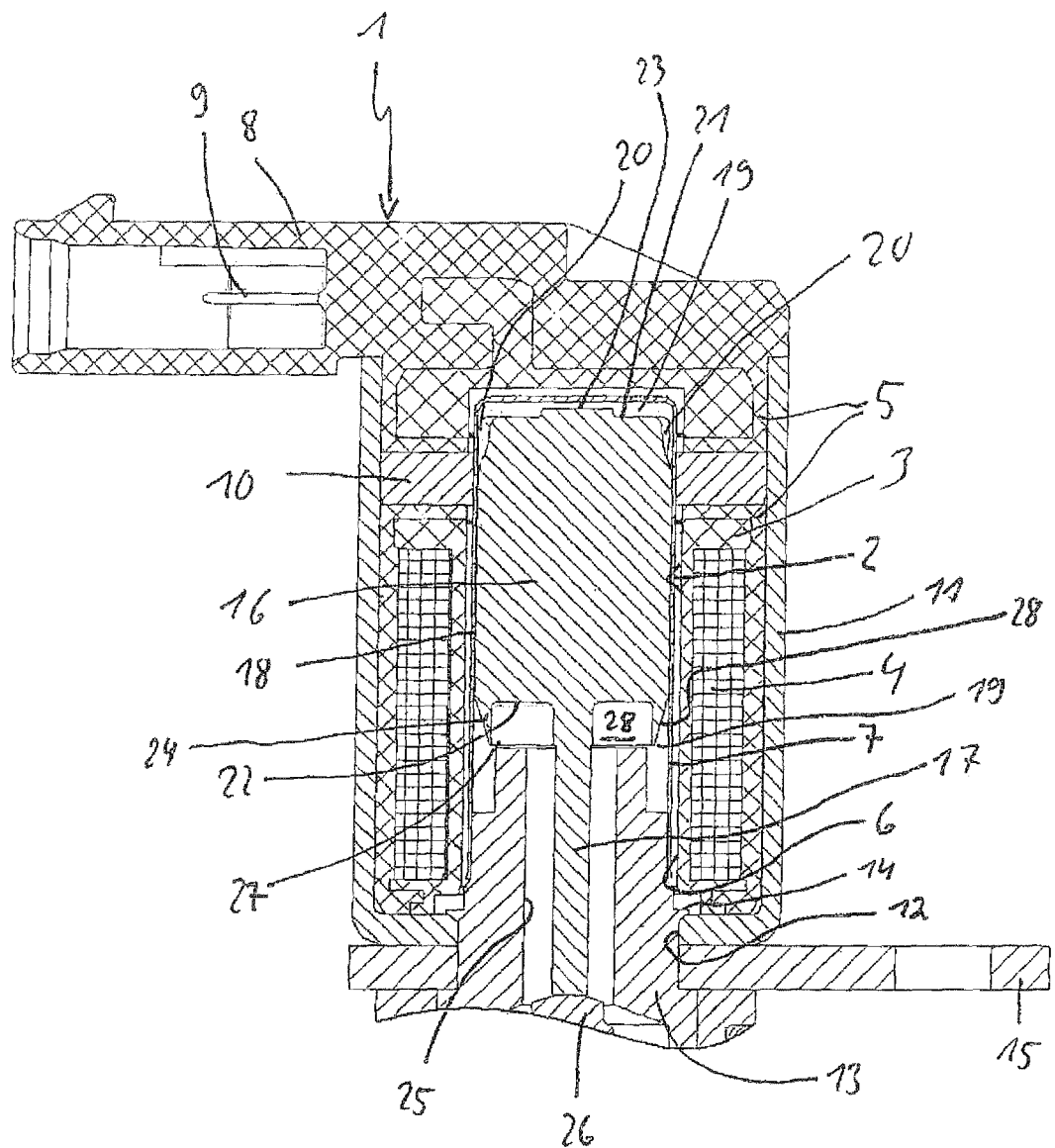
FIG. 1 shows an electromagnetic actuating unit of a hydraulic valve with an activation element according to the invention in a longitudinal section.

FIG. 1 shows an electromagnetic actuating unit 1 of a hydraulic valve with an activation element 2 according to the invention in a longitudinal section. The electromagnetic actuating unit 1 has a coil former 3 composed of a nonmagnetizable material, which coil former 3 bears a coil 4 composed of a plurality of turns of a suitable wire. The coil 4 and the coil body 3 are held in a cylindrical section of a carrier 5. The carrier 5 is composed of a nonmagnetizable material and has, on a base surface of the cylindrical section, a blind-hole-like receptacle 6 in which a pot-shaped armature guiding sleeve 7 is arranged. In the region of the base of the armature guiding sleeve 7, the carrier 5 has a connecting element 8 with electrical contacts 9, and a first magnet yoke 10 which extends outward from the armature guiding sleeve 7 in the radial direction. The cylindrical section of the carrier 5 is arranged within a pot-shaped housing 11, the base of which has a central through-opening 12 which is embodied flush with the receptacle 6. A second magnet yoke 13, which extends into the armature guiding sleeve 7, engages in the through-opening 12. The second magnet yoke 13 is connected by means of a crimped connection 14 to the housing 11, with an attachment flange 15 being arranged between the base of the housing 11 and a shoulder of the second magnet yoke 13.

Figure 2:
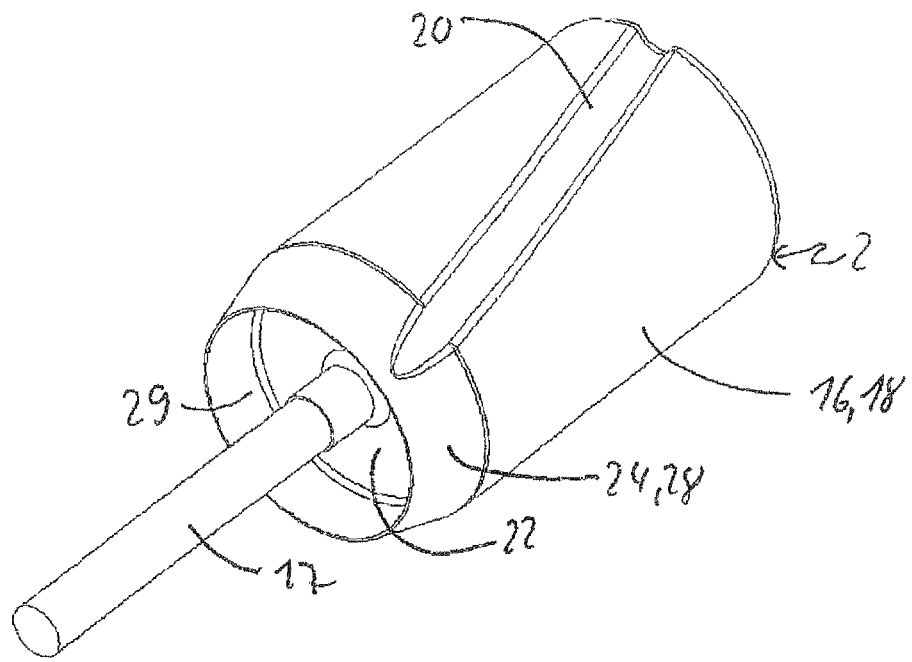
FIG. 2 shows a perspective view of the activation element from FIG. 1.

The activation element 2 is arranged in an axially slidable fashion in the armature guiding sleeve 7. The activation element 2 comprises an armature 16 and a plunger rod 17. The armature 16 is of essentially cylindrical design, with an outer lateral surface 18 of the armature 16 being adapted to the armature guiding sleeve 7. The armature 16 therefore divides the region bounded by the armature guiding sleeve 7 into two spaces 19 which are axially spaced apart from one another. Grooves 20 are formed on the lateral surface 18 of the armature 16 (FIG. 2), said grooves 20 extending from a base surface 21 to a covering surface 22 of the cylindrical armature 16, with the result that the spaces 19 communicate with one another via the grooves 20. The grooves 20 do not extend strictly in the axial direction but are instead positioned with respect to the axis of the armature 16, with the result that said grooves 20 extend in a helical shape on the lateral surface 18. As a result, the support of the armature 16 in the armature guiding sleeve 7 is improved and magnetic lateral forces on the armature 16 are reduced.

Figure 3:
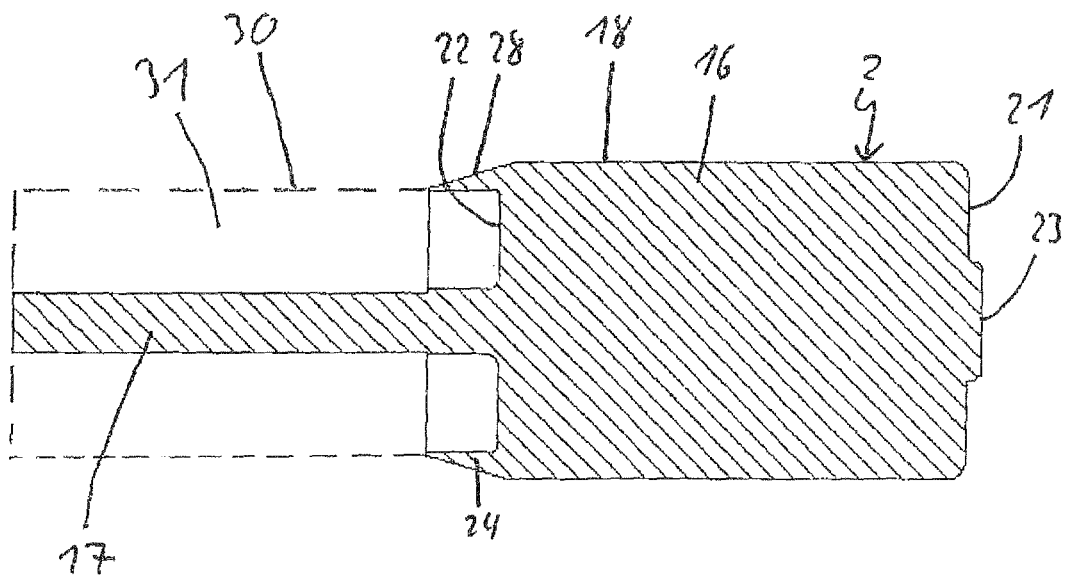
FIG. 3 shows a longitudinal section through the activation element in FIG. 2.

A bulge 23 (FIG. 3) which serves as a stop on the base of the armature guiding sleeve 7 is provided on the base surface 21 of the armature 16. The adhesion force which acts on the base of the armature guiding sleeve 7 when the armature 16 bears against said base is therefore reduced.

An annular magnet cone 24, which extends in the axial direction, is formed on the covering surface 22. In this context, the outer diameter of the magnet cone 24 is reduced as the distance from the covering surface 22 of the armature 16 increases. A cylindrical cavity 29 is formed radially within the magnet cone 24.

The plunger rod 17 is embodied in one piece with the armature 16 and extends through the cavity 29 in the axial direction starting from the covering surface 22. The plunger rod 17 engages through an opening 25 in the second magnet yoke 13, with an axial end of the plunger rod 17 bearing against a control piston 26 (illustrated only partially) of a hydraulic section of the hydraulic valve.

During the operation of the hydraulic valve, the energization of the coil 4 is regulated, as a result of which a magnetic field is generated within the actuating unit 1. The first magnet yoke 10, the housing 11, the second magnet yoke 13 and the armature 16, which are composed of magnetizable materials, serve here as a flow path which is completed by an air gap 27 between the armature 16 and the second magnet yoke 13. When the coil 4 is energized, a force acts on the armature 16 in the direction of the second magnet yoke 13, which force is dependent on the level of energization of the coil 4. By balancing out the magnetic force which acts on the armature 16 and a spring force which acts on the control piston 26 it is possible for the armature 16 and therefore the control piston 26 to be positioned in any desired position between two extreme positions. In this context, the second magnet yoke 13 can dip into the cavity 29. The two spaces 19 are connected via the grooves 20, said spaces 19 being arranged in the axial direction of the armature 16 and separated therefrom. During the movement of the armature 16, pressure equalization can occur between the spaces 19 via the grooves 20 and a lubricant which is present in the actuating unit 1 can be replaced. The hysteresis of the current/travel characteristic curve of the actuating unit 1 is therefore reduced.

The armature 16 is manufactured by means of an extrusion method. For this purpose, pressure is applied to a blank, for example to a piece of wire, of a suitable material by means of a die, with the result that the material begins to flow below its melting temperature, and fills a mold which constitutes a negative of the desired shape of the armature 16. The advantage of this method is the surface quality which it provides, as a result of which complex and cost-intensive post-processing steps are not necessary. The surfaces which have to be fabricated with high precision can therefore be fabricated in an off-tool fashion during the extrusion method without material-removing post-processing steps being necessary. Such surfaces are, for example, the lateral surface 18 of the armature 16, which serves as a bearing point of the armature 16, or the outer lateral surface 28 of the magnet cone 24, the contour of which has a decisive influence on the contour of the magnetic flow and therefore on the force/travel characteristic curve of the actuating unit 1. Furthermore, additional structures, for example the grooves 20 or the bulge 23, can be implemented in a cost-effective way during the extrusion method.

During the manufacture of the activation element 2, a blank 30 (illustrated by dashed lines) is firstly manufactured in the extrusion method, which blank 30 has the outer contours of the armature 16 and of the magnet cone 24, including the grooves 20 and the bulge 23, of the required quality. In the region of the plunge rod 17, the blank 30 has a material region 31 (illustrated by dashes) which extends in the axial direction starting from the end of the magnet cone 24 and has an excess of material compared to the plunger rod 17 which is to be fabricated. In a subsequent, for example material-removing, working step, the plunger rod 17 and the cavity 29 are formed radially within the magnet cone 24.

LIST OF REFERENCE NUMERALS

1 Actuating unit
2 Activation element
3 Coil former
4 Coil
5 Carrier
6 Receptacle
7 Armature guiding sleeve
8 Connecting element
9 Contact
10 First magnet yoke
11 Housing
12 Through-opening
13 Second magnet yoke
14 Crimped connection
15 Attachment flange
16 Armature
17 Plunger rod
18 Lateral surface
19 Space
20 Groove
21 Base surface
22 Covering surface
23 Bulge
24 Magnet cone
25 Opening
26 Control piston
27 Air gap
28 Outer lateral surface
29 Cavity
30 Blank
31 Material region

The invention claimed is:
1. An activation element of an electromagnetic actuating unit of a hydraulic valve, comprising:
an essentially cylindrical armature, which has a lateral surface and a base surface, slidably arranged in the actuating unit, the armature being formed by an extrusion process with the lateral surface and the base surface of the armature being formed without material-removing post-processing steps, the lateral surface of the armature having a groove extending radially into the essentially cylindrical armature arranged so that two spaces, which are separated from the armature in an axial direction, communicate with one another, the armature, the groove has a profile with an axial component and a component in a circumferential direction of the armature wherein the armature has a covering surface and a magnet cone constructed on the covering surface so as to form an outer lateral surface and define a cylindrical cavity in the armature, with the outer lateral surface of the magnet cone being formed by the extrusion process without material-removing post-processing steps.

2. The activation element according to claim 1, wherein the groove is formed on the armature by the extrusion process without material-removing post-processing steps.

3. The activation element according to claim 1, wherein the base surface of the armature has a bulge at a center axis of the armature which is formed on the armature by the extrusion process without material-removing post-processing steps.

4. The activation element according to claim 1, wherein the magnet cone is annular.

5. The activation element according to claim 1, wherein the activation element further comprising a plunger rod embodied in one piece with the armature so as to extend in an axial direction starting from the covering surface of the armature.

* * * * *